United States Patent [19]
McBride et al.

[11] Patent Number: 6,106,685
[45] Date of Patent: Aug. 22, 2000

[54] ELECTRODE COMBINATIONS FOR PUMPING FLUIDS

[75] Inventors: Sterling Eduard McBride, Lawrenceville, N.J.; Pamela Kay York, Yardley, Pa.

[73] Assignee: Sarnoff Corporation, Princeton, N.J.

[21] Appl. No.: 08/998,406

[22] Filed: Dec. 24, 1997

Related U.S. Application Data

[63] Continuation-in-part of application No. 08/937,817, Sep. 29, 1997, Pat. No. 5,980,719.
[60] Provisional application No. 60/046,321, May 13, 1997, and provisional application No. 60/046,293, May 13, 1997.

[51] Int. Cl.[7] .................................................. G01N 27/26
[52] U.S. Cl. ........................................ 204/600; 422/100
[58] Field of Search ................................. 347/20, 29, 40, 347/41, 44, 55, 42; 422/50, 99, 100, 129; 204/450, 451, 600, 601

[56] References Cited

U.S. PATENT DOCUMENTS 4,364,054  12/1982  Kelly ........................................ 346/1.1
5,940,098   8/1999  Minemoto et al. .

FOREIGN PATENT DOCUMENTS 2239309  7/1975  Germany .
2455019  7/1975  Germany .

OTHER PUBLICATIONS

Englisn language translation of Grunecker et al. (DE 2455019 A1), Jul. 1975.
Fuhr et al., "Microfabricated electrohydrodynamic (EHD) pumps for liquids of higher conductivity," *INSPEC Abstract No.: C9305–3260J–002*, Sep. 1992.
Fuhr et al., "Pumping of water solutions in microfabricated electrohydrodynamic systems," *INSPEC Abstract No.: C9301–3260J–006*, Feb. 1992.
Richter et al., "The electrohydrodynamic micro flow meter," *INSPEC Abstract No.: A9213–4780–013, B9207–7230–074*, Jun. 1991.

*Primary Examiner*—Jill Warden
*Assistant Examiner*—Alex Noguerola
*Attorney, Agent, or Firm*—William J. Burke

[57] ABSTRACT

Provided is a device that moves liquid comprising: a channel; and, an electrode-based pump comprising two or more electrodes which when powered form stronger or weaker electric field lines between the electrodes, wherein the electrodes are arrayed so that (a) the strongest electric field lines cross a cross-section of the channel or (b) the electrodes are concentrically arrayed around the channel such that the strongest electric field lines parallel the channel on more than one face of the channel.

24 Claims, 6 Drawing Sheets

ELECTRODE COMBINATIONS FOR PUMPING FLUIDS

This application claims the benefit of U.S. application Ser. No. 60/046,321, filed May 13, 1997 (SAR 12519P) and a continuation-in-part of U.S. application Ser. No. 08/937,817, filed Sep. 29, 1997, now U.S. Pat. No. 5,980,719 which claims the benefit of U.S. application Ser. No. 60/046,293, filed May 13, 1997 (SAR 12523P).

The present invention relates to pumps, particularly pumps operable in a microfluidics device, where the pumps move fluid by means of electrodes. In particular, the invention relates to such pumps that include electrodes arrayed so that (a) the strongest electric field lines cross a cross-section of the channel or (b) the electrodes are concentrically arrayed around the channel such that the strongest electric field lines parallel the channel on more than one face of the channel.

With advances in techniques for fabricating small structures on materials has come increased discussion of automated devices that conduct various chemistries in such small structures. Such automated devices hold the promise of bringing reproducible chemistries away from large, specialized laboratories, and reducing the volumes of sample material (in the case of assay chemistries) and reagents needed to conduct the chemistries. These devices are often termed "microfluidics" devices. Other uses for microfluidics devices include printer heads.

Liquids can be moved by applying voltages to appropriately configured electrodes. One form of these pumps, which are generally referred to as electroosmotic or "EO" pumps, typically uses relatively widely-spaced electrodes. These EO pumps are operable with relatively conductive fluids. Other electrode-based pumps have operated with more closely spaced electrodes and, typically, with less conductive fluids. The term "electrohydrodynamic" or "EHD" pumps can be used to generally refer to the pumps that move fluids with electrodes. Several recent advances have increased the practical applicability of these pumps to microfluidics devices. For example, U.S. Pat. No. 5,842,106 (U.S. application Ser. No. 08/554,887, filed Nov. 9, 1995) describes a practical method of fabricating an extensive array of electrodes in a small-scaled device formed in a substrate. U.S. Pat. No. 5,747,169 (U.S. application Ser. No. 08/745,766, filed Nov. 8, 1996) describes methods of anodically joining glass plates on which small-scaled structures have been formed. U.S. Pat. No. 5,846,396 (U.S. application Ser. No. 08/556,036, filed Nov. 9, 1995) describes capillary barriers that increase the degree to which selective pumping of reagents can be controlled. U.S. application Ser. No. 08/821,480, filed Mar. 21, 1997 describes applying defined pulsed voltages to the electrodes that supply pumping pressure to reduce the amount of bubbling produced by the electrodes and thereby increase the range of liquids that can be pumped with electrodes in a microfluidics device.

In U.S. application Ser. No. 08/556,423, filed Nov. 9, 1995, a point and ring electrode pump was described. The advantages for such a pump include the asymmetric electrical field generated by the pump which allows a greater variety of fluids to be pumped in the same direction upon applying a voltage of a given polarity. The '423 application includes a figure showing the force vectors of such an asymmetric field and illustrating that the area in a fluid channel where a solvated ion of one polarity would be influenced by a strong field pushing it in one direction is greater than the area where a strong field would push a solvated ion of that polarity in the (−) direction.

The present application teaches, among other things: forms of pumps that include ring electrodes that can be fabricated by mass production techniques; and various structural features associated with the ring electrodes that can produce increases in the pressure generated by electrohydrodynamic pumps.

SUMMARY OF THE INVENTION

In one embodiment, the invention provides a device that moves liquid by means of electrodes comprising: a channel; and an electrode-based pump comprising two or more electrodes which when powered form stronger or weaker electric field lines between the electrodes, wherein the electrodes are arrayed so that (a) the strongest electric field lines cross a cross-section of the channel or (b) the electrodes are concentrically arrayed around the channel such that the strongest electric field lines parallel the channel on more than one face of the channel. In a preferred embodiment, the channel is of capillary dimensions. Preferably, the electrode-based pump comprises: (a) a first electrode on one face of the channel and a second electrode on a separate face of the channel; or (b) two or more pairs of coupled electrodes jointly located in the channel; or (c) electrodes wherein at least one electrode is radially arrayed along the sides of the channel; or (d) a first electrode and a second electrode arrayed so that the strongest electric field lines are substantially parallel to the direction of liquid flow in the channel. In one particular embodiment, one or more electrodes are formed at an outlet of the channel.

In another embodiment, the pump that moves liquid by means of electrodes comprises: a channel with an outlet [such as into a less restrictive space]; a first electrode formed at the outlet; and electrically coupled to the first electrode, a second electrode in the channel. In a preferred embodiment, the channel is of capillary dimensions. In one particular embodiment, the outlet forms a capillary barrier. Preferably, the strongest electric field lines are substantially parallel to the direction of liquid flow in the channel. In certain embodiments, one of the electrodes is aligned with the center of a straight channel segment, and can be, for example, a point electrode.

In certain preferred embodiments the device is formed in a substrate formed of an electrode-forming plate and at least one additional plate joined together, and wherein the first electrode comprises a conductive material incorporated into the electrode-forming plate and the outlet comprises a hole formed in the conductive material. In certain other preferred embodiments, the device is formed in a substrate formed of an electrode-forming plate and at least one additional plate joined together, and wherein the outlet comprises a hole formed in the electrode-forming plate and the ring electrode comprises a conductive layer applied to at least one side of the electrode-forming plate.

BRIEF DESCRIPTION OF THE DRAWINGS

FIG. 11A shows a side view of a portion of a liquid handling device where the ring electrode is formed with a conductive coating, while

DEFINITIONS

The following terms shall have, for the purposes of this application, the meaning set forth below. In particular, for the purpose of interpreting the claims, the term definitions shall control over any assertion of a contrary meaning based on other text found herein:

Capillary Dimensions

"Capillary dimensions" are dimensions that favor capillary flow of a liquid. Typically, channels of capillary dimensions are no wider than about 1.5 mm. Preferably channels are no wider than about 500 μm (micron), yet more preferably no wider than about 250 μm, still more preferably no wider than about 150 μm.

Capillary Barrier

A "capillary barrier" is a barrier to fluid flow in a channel comprising an opening of the channel into a larger space designed to favor the formation, by liquid in the channel, of an energy minimizing liquid surface such as a meniscus at the opening.

Coupled Electrodes Jointly Located in the Channel

Figure 7A:
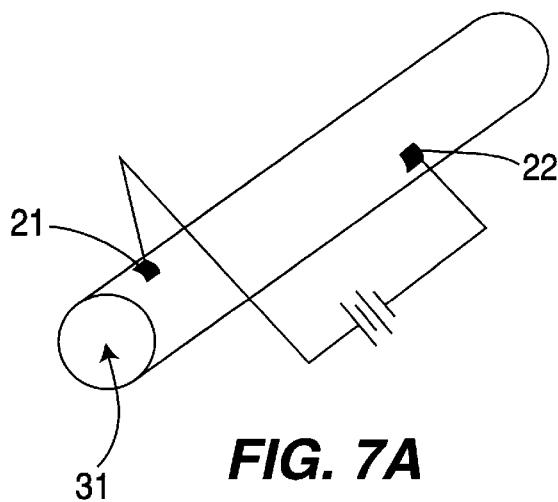
Figure 7B:
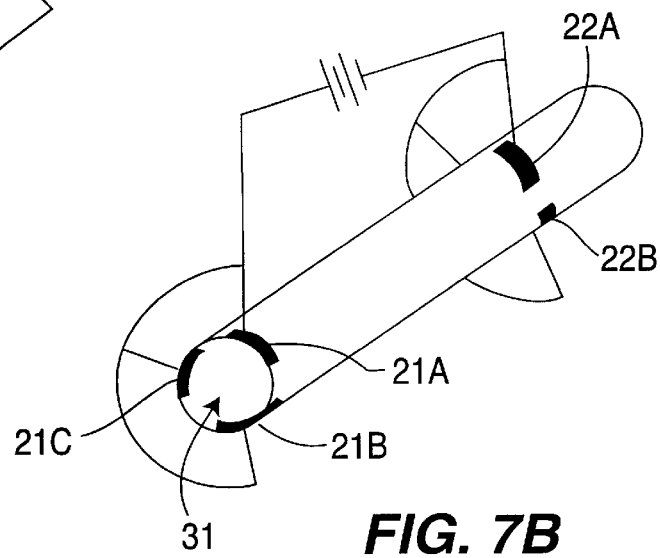

Paired electrodes are jointly located in a channel if each first member of the pair intersects a channel at a first point, and each second member of a pair intersects at a second point, such as in FIG. 7B.

Electrically Coupled

Two electrodes are electrically coupled if they can be operated to activate or deactivate an electrical potential between the two.

Electrode Radially Arrayed Along the Sides of the Channel

An electrode is radially arrayed along the sides of a channel if its channel-intersecting surface encompasses at least about 30° radial degrees of the channel (more preferably at least about 15°, and still more preferably at least about 5°), measured about the median axis of the channel. Thus, for example, a channel with a circular cross-section can have electrode surface on alternating 60° arcs around a circumference of the channel, such that there are three electrodes radially arrayed along the sides of the channel at the location of the circumference.

Electrodes on Separate Channel Faces

Where the sides of a channel do not define distinct facets running along the length of the channel, electrodes with an offset of about 30° shall or more are considered to be on a separate face, and, where the sides of a channel do define distinct facets running along the length of the channel, electrodes on separate facets are on "separate faces."

Hole Diameter

Because techniques for fabricating small holes often create holes that are wider at one end than the other (for instance, about 50 microns wider), the hole diameter values recited in this document refer to the narrowest diameter.

Point Electrode

The term "point electrode" refers to an electrode designed to be formed about a center point that intersects with a liquid handling channel.

Ring Electrode

The term "ring electrode" is not intended to require that a electrode be a circular but instead that it be formed along the edges of a channel outlet or on the walls of a channel so as to surround or "ring" the channel.

Strongest Electric Field Lines Substantially Parallel to Liquid Flow in a Channel The strongest electric field lines substantially parallel to liquid flow in a channel if they are no more than about 60° offset from the direction of liquid flow. Preferably the strongest electric field lines are no more than about 30° offset, yet more preferably no more than about 10° offset from the direction of flow.

DETAILED DESCRIPTION OF THE INVENTION

Figure 1:
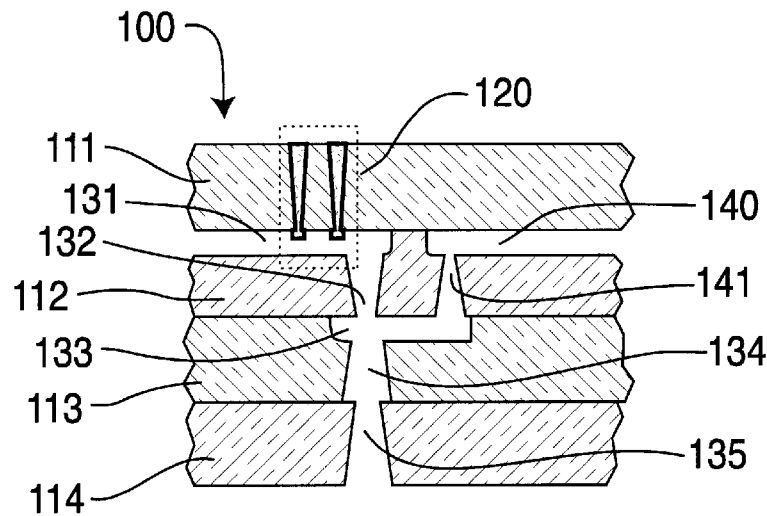
FIG. 1 displays a liquid handling device that does not have a ring electrode, but which does illustrate other aspects of the present invention.

FIG. 1 illustrates an electrode-based pump 120 incorporated into a liquid handling device 100 with an outlet 132 which is a capillary barrier for inhibiting liquid flow in the absence of a voltage applied to the pump. The liquid handling device 100 is formed of first layer or plate 111, second layer or plate 112, third layer or plate 113 and fourth layer or plate 114. Where these layers or plates are formed of a suitable material such as glass, they can be joined by anodic bonding, such as is described in U.S. Pat. No. 5,747,169, (U.S. application Ser. No. 08/745,766, filed Nov. 8, 1996). With plastic, for example, the plates can be joined with adhesives, thermal bonding, ultrasonic bonding, and the like.

Fluid channel 131 continues until it reaches outlet 132 which opens into chamber 133. From chamber 133, liquid flows through well feed 134 which includes a first back-flow stop 135 (which is essentially a capillary barrier). The flow from well feed 134 can continue into a receptacle such as a well aligned at the outlet of well feed 134. Should fluid flow back from the receptacle, back-flow stop 135 serves to create a meniscus inhibiting further back flow. Gas feed 140 is used to inject gas into the chamber 133 and out of the well feed 134 to re-initialize or dry the capillary barrier 132, increasing its effectiveness in inducing liquid at the outlet 132 to form a meniscus that inhibits flow. The gas feed 140 thereby provides a reset feature or valve (since it allows greater selectivity in the liquid that is moved into a mixing or reaction site by assuring that the non-desired inputs are fully turned. off). Second back-flow stop 141 serves to inhibit liquid flow into a gas distribution system that includes gas feed 140.

The pumps of liquid distribution systems can be improved over those illustrated in FIG. 1, so that the field lines in the channel implied by applying a voltage across the electrodes cross a cross-section of the liquid in the channel or that the strongest electric field lines parallel the channel on more than one face of the channel. FIGS. 2–5 illustrate a number of particular examples of such pumps. FIGS. 6–9 illustrate a number of other orientations of the electrodes that can accomplish these advantageous orientations of the field lines created by pumping electrodes.

Figure 2:
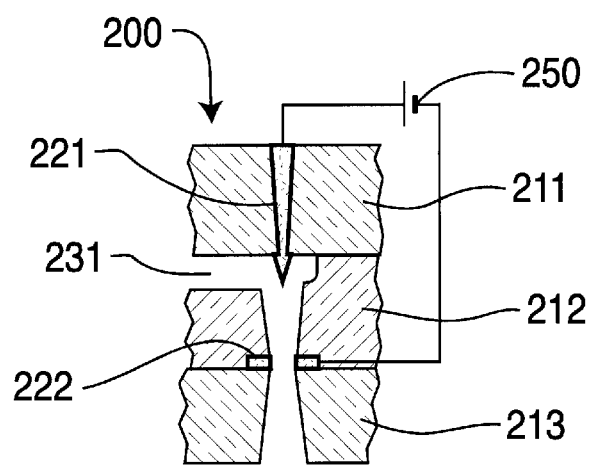
FIGS. 2–5 illustrate liquid handling devices that incorporate ring electrodes.

For example, FIG. 2 shows a liquid handling device 200 formed of first plate 211, second plate 212 and third plate 213. A point electrode 221, ring electrode 222 and voltage source 250 operate to pump liquid in fluid channel 231. An orientation of the electrodes of FIG. 2 can accomplish a directing the strongest electric field lines in the direction of anticipated fluid flow, as the dotted field lines representing such field lines illustrate in the similar embodiments of FIGS. 8 and 9.

Figure 3:
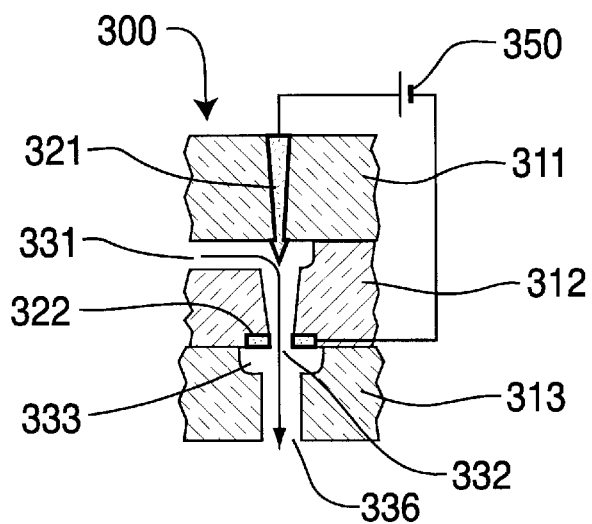

FIG. 3 shows a liquid handling device 300 formed of first plate 311, second plate 312 and third plate 313. A point electrode 321, ring electrode 322 and voltage source 350 operate to pump liquid through fluid channel 331 and out of outlet 332 (which is a capillary barrier). Outlet 332 opens into chamber 333, which drains through well feed outlet 336.

Figure 4:
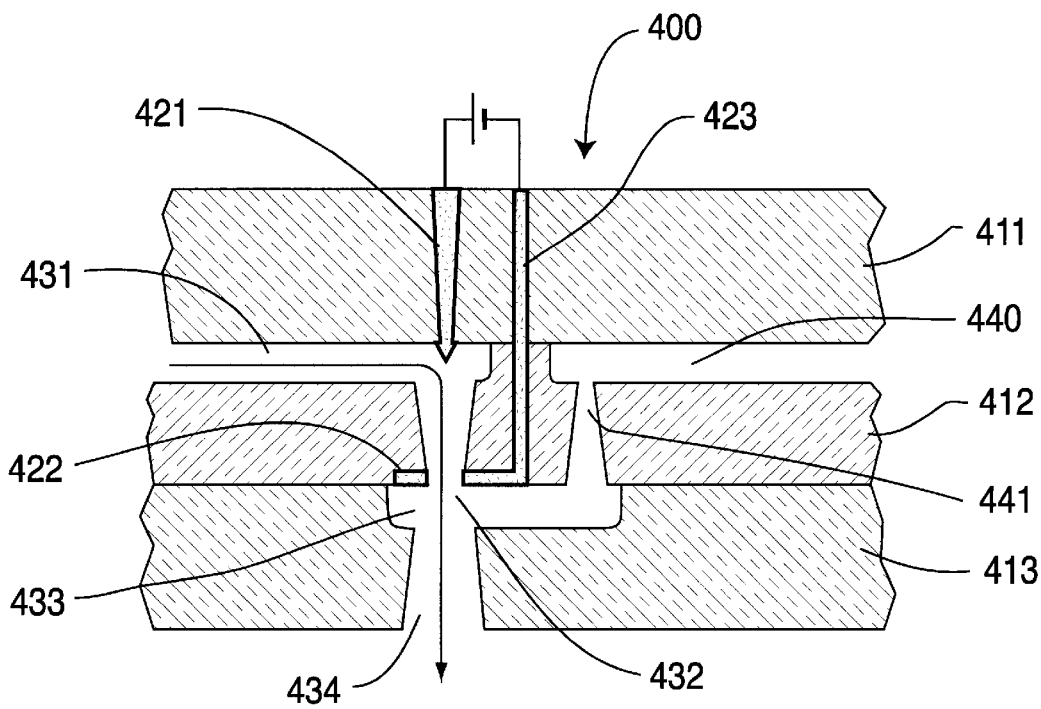

In FIG. 4, a liquid handling device 400 is formed of first plate 411, second plate 412 and third plate 413. A point electrode 421, ring electrode 422, electrical conduit 423 and voltage source operate to pump liquid through fluid channel 431 and out of outlet 432 (which is a capillary barrier). Outlet 432 opens into chamber 433, which drains through well feed 434. Gas feed 440 is used to inject gas into the chamber 433, Back-flow stop 441 serves to inhibit liquid flow into a gas distribution system that includes gas feed 440.

Figure 5:
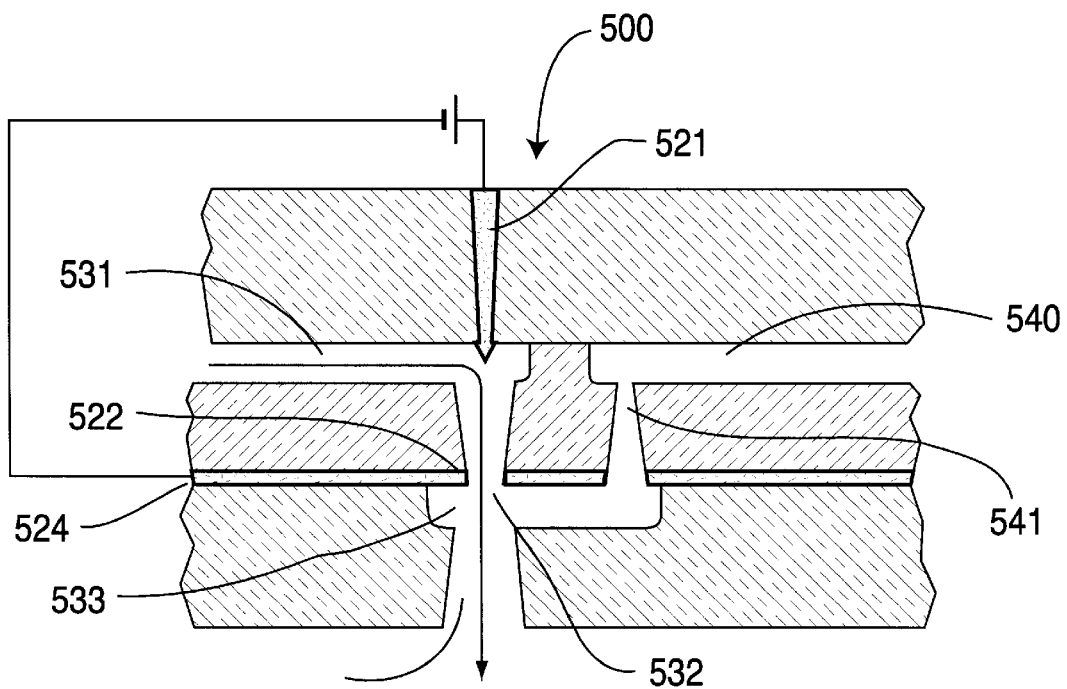

FIG. 5 shows a liquid handling device 500 with features consistently numbered as in the previously discussed liquid handling devices, except that ring electrode 522 is formed as a hole in a conductive layer 524. Where the conductive layer is doped silicon, such as silicon doped with, for example, boron, phosphorus or the like, an additional advantage is obtained since silicon is particularly suitable for microfabrication techniques such as laser ablation and chemical etching such as reactive ion etching. In this way, the geometry of the capillary barriers formed at the outlet 532 of the channel 531 can be particularly well controlled. Another advantage of silicon layers intervening in a structure formed of glass plates is that there is no need to apply a bonding-assist material such as silicon to join the silicon to glass by anodic bonding.

Figure 6:
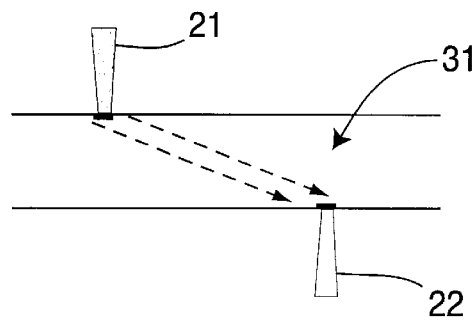
FIGS. 6, 7A, 7B, 7C, 8 and 9 illustrate a number of electrode-based pumps of the invention.

FIG. 6 shows another way to assure that the field lines cross a cross-section of a channel. In the Figure, electrode 21 is formed on one side of channel 31, and another electrode 22 is formed on the other side. Thereby, the field lines illustrated with dashed lines necessarily cross the channel while providing a motive force in the direction of desired flow (here left to right). FIG. 7A illustrates that the second electrode 22 need only be partially offset from the face of the channel on which the first electrode is located. Where the channel sides have distinct facets, the electrodes are preferably located on distinct facets. Preferably, where the median line of a channel defines a central axis, the electrodes are preferably offset from each other by at least about 30°, more preferably by at least about 90°, still more preferably by at least about 180°.

Figure 7C:
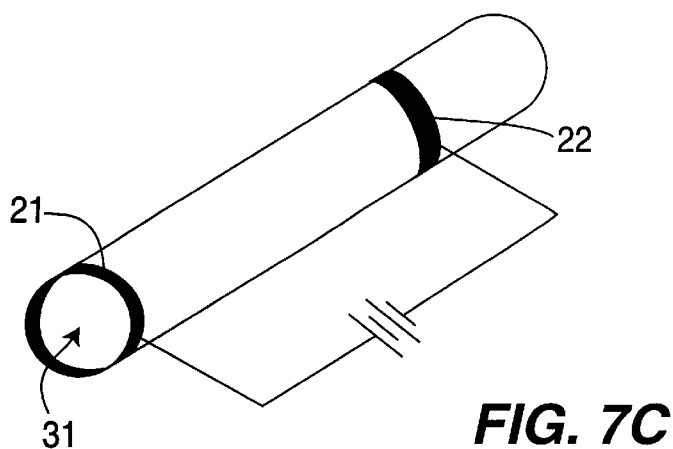

FIGS. 7B and 7C illustrate that orienting the strongest electric field lines parallel the channel on more than one face of the channel can be accomplished with, for example, more than on set of paired electrodes or with ring electrodes. In FIG. 7B, alpha first electrode 21A is paired with alpha second electrode 22A, beta first electrode 21A is paired with beta second electrode 22A, and gamma first electrode 21A is paired with gamma second electrode 22A. In the illustrated embodiment, all of the first electrodes 21 and second electrodes 22 are operated at the same potential (or the same pulsed pattern of electrical potential). In FIG. 7C, first electrode 21 and second electrode 22 are ring electrodes.

Figure 8:
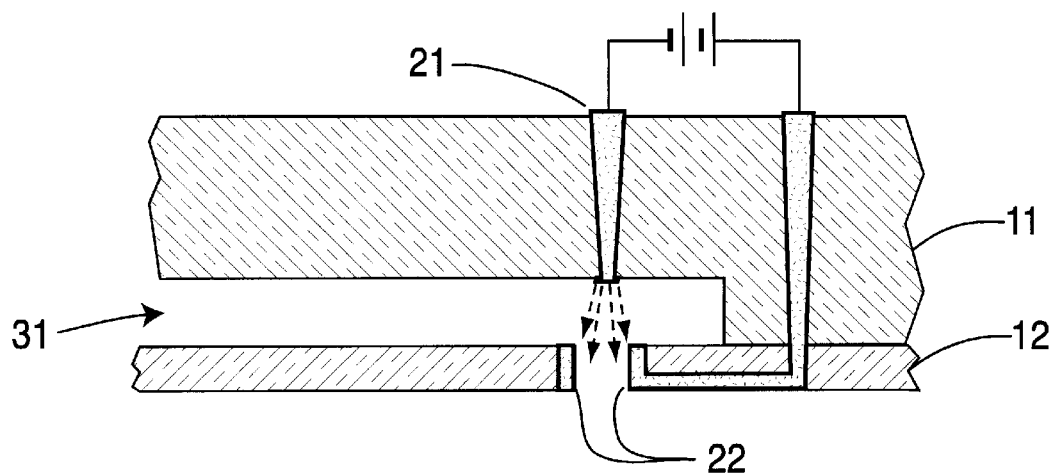
Figure 9:
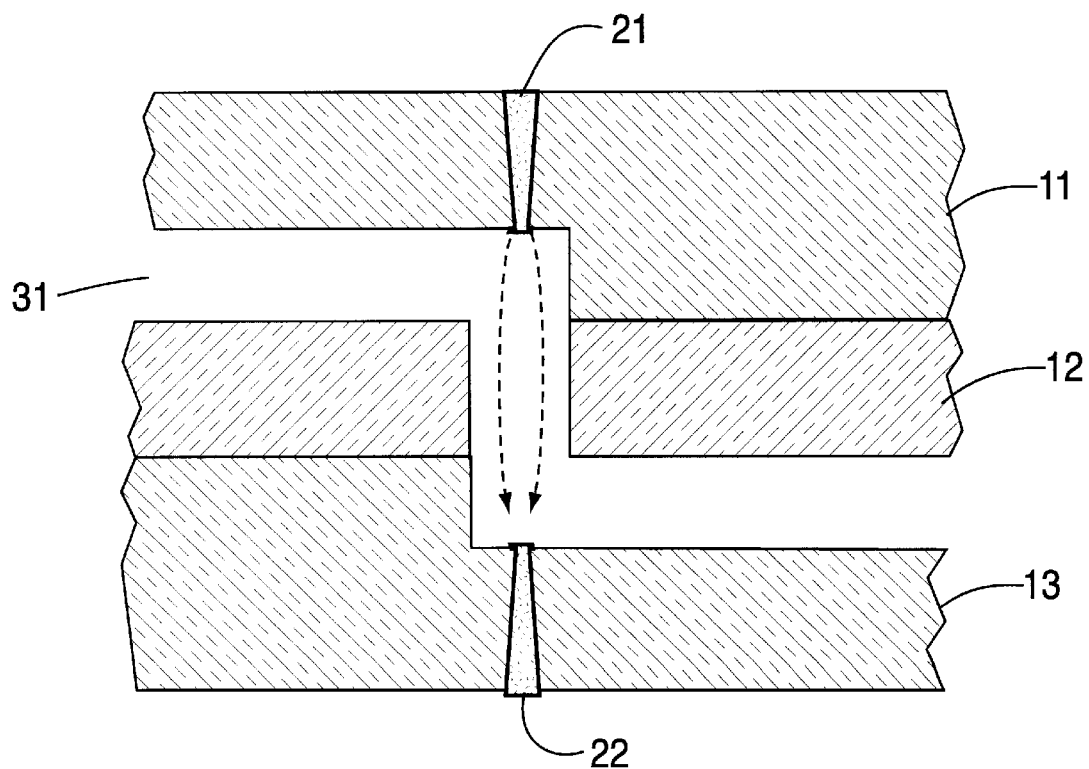

In FIG. 8, a point electrode 21 and a ring electrode 22 in an apparatus that includes first layer 11 and second layer 12 create field lines (dashed lines) in the direction of fluid flow through the ring electrode 22. In FIG. 9, a first point electrode 21 and a second ring electrode 22 in an apparatus the includes first layer 11, second layer 12 and third layer 13 create field lines (dashed lines) in the direction of fluid flow (here top to bottom).

Figure 10:
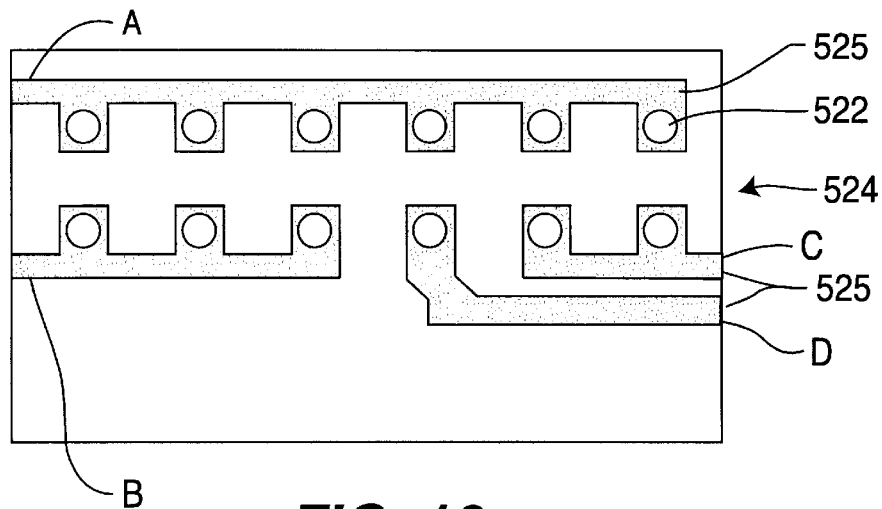
FIG. 10 shows a pattern of conductive material in a conductive layer which can be used to direct voltages to specific ring electrodes.

FIG. 10 shows a top view of a conductive layer 524 in which the conductive material 525 is arranged in a pattern that can be used to selectively deliver voltage to a single ring electrode. 522 or a subset of ring electrodes 522. For example, voltage applied at point A delivers voltage to six ring electrodes 522, voltage at point B powers three ring electrodes 522, voltage at point C powers two ring electrodes 522 and voltage at point D powers one ring electrode 522.

Figure 11A:
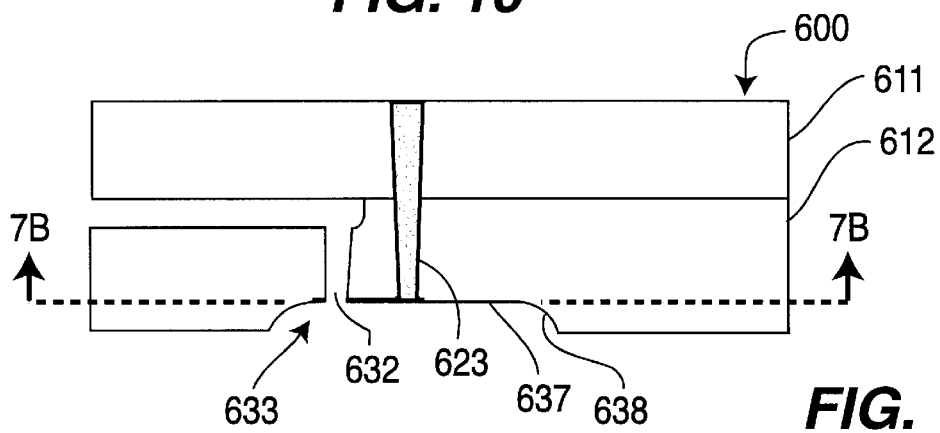
Figure 11B:
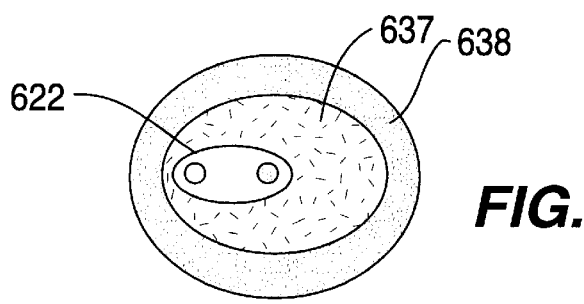
FIG. 11B shows a bottom view of the portion of the liquid handling device.
Figure 12:
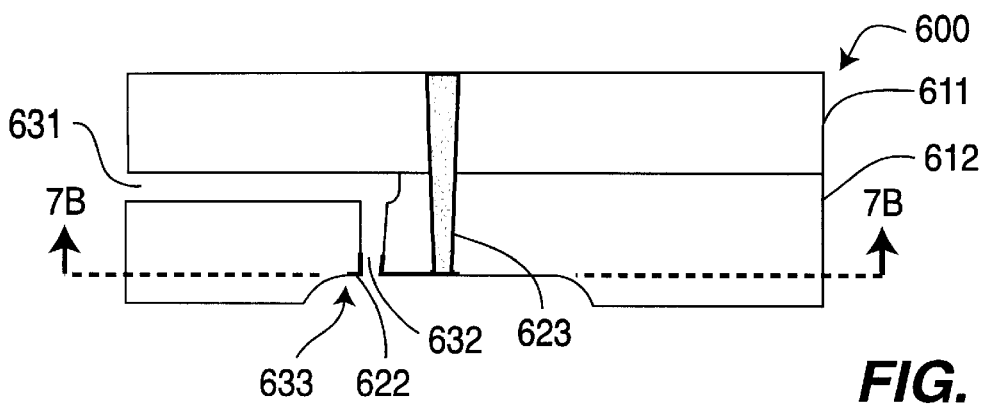
FIG. 12 shows an alternate embodiment of the portion of a liquid handling device shown in FIG. 7A.

As FIGS. 11A and 11B illustrate, a liquid handling device 600 (which is partially illustrated) can have a chamber 633 formed at least in part in the bottom portion of a second plate 612. The liquid handling device 600 has an electrical conduit 623 which can for example be made of fused via ink, as described in U.S. Pat. No. 5,842,106 (U.S. application Ser. No. 08/554,887, filed Nov. 9, 1995). As can be seen in the bottom view of FIG. 7B, the ring electrode 622 can be formed by applying a conductive coating around outlet 632. The conductive coating can be extensive enough to create the electrical connection with electrical conduit 623. FIG. 12 shows a somewhat modified version of liquid handling device 600 where the conductive coating forming ring electrode 622 extends into a portion of fluid channel 631.

Figure 13A:
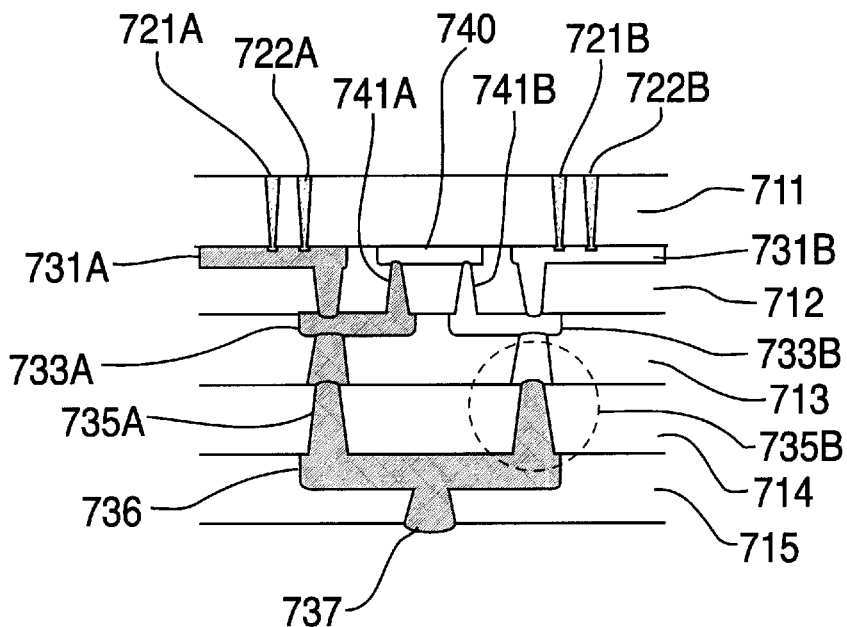
FIGS. 13A and 13B show elements of liquid distribution systems that have features for limiting the flow of a liquid into portions of the systems where flow is not desired.
Figure 13B:
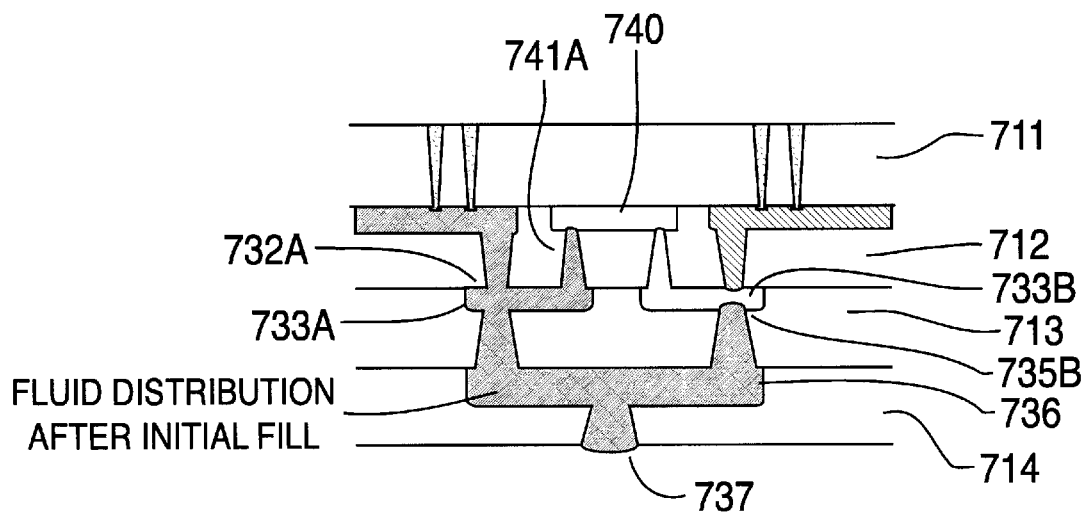

An aspect of the present invention is the ability to limit backwards fluid flows of a first liquid into elements of a liquid distribution system intended to distribute for example gas or another liquid. In part, this aspect is discussed above with reference to FIG. 1. FIG. 13A shows how such "back flow stop valves" act to limit cross contamination within a liquid distribution system. The apparatus of FIG. 13A is formed in a substrate having at least first layer 711, second layer 712, third layer 713, fourth layer 714 and fifth layer 715. The apparatus has a first fluid channel 731A and a second fluid channel 731B, each having a pump made up of first electrode 721 and second electrode 722. First back flow stop valve 735A and second back flow stop valve 735B prevent liquid from backing up from manifold 736 into higher parts of third channel 734A or fourth channel 734B, such as flowing into first chamber 733A or second chamber 733B. Third back flow stop valve 741A and fourth back flow stop valve 741B prevent back flow into gas feed 740. Another version of such an apparatus is shown in FIG. 13B, where the features are formed in first layer 711, second layer 712, third layer 713 and fourth layer 714. In the illustration, a first fluid indicated by gray shading is pumped past first capillary barrier 732A, into first chamber 733A and manifold 736, and out of outlet 737. The first liquid is inhibited from intruding into the gas distributing channels and into the portion of the apparatus where a second liquid, indicated by hatched lines, is prevented from downward flow by second capillary break 732B. The design of FIG. 13A allows the top face of fourth layer 714 to be smoothed by lapping a polishing prior to being joined with third layer 713, thereby increasing the smoothness of the capillary break geometry that forms first back flow stop valve 735A and second back flow stop valve 735B, which smoothness increases the efficiency of those capillary barriers.

Preferably, the pumps of the devices are relatively simple, with, for example, a pump made up electrodes located at two positions in a channel effective to create enough pressure to move liquid. More preferably, two electrodes are effective to create enough pressure to move liquid.

Preferably, the channels with which the pumps of the invention are used are of capillary dimensions. In certain embodiments, the channels are about 2 mm or less or about 10 mm or less in diameter. In other embodiments, the channels are larger than about 10 mm in diameter.

Operational Considerations for Electrode-based Pumps

It should be understood that the phenomenon of creating pumping pressure with electrodes involves various forces. Thus, the pumps may operate under one or more forces, e.g., electrokinetic (coulomb) forces such as electrophoretic and electro-osmotic forces, Kelvin polarization force, dielectric force and electrostrictive force.

More specifically, force density acting on a dielectric fluid can be expressed generally as:

$$F = qE + \vec{P} \cdot \nabla \vec{E} - \frac{1}{2}E^2 \nabla \varepsilon + \nabla \left[ \frac{1}{2} \rho \frac{\partial \varepsilon}{\partial \rho} E^2 \right] \quad (1)$$

where, q=free space charge density
E=electric field
ε=permittivity
P=polarization vector
ρ=mass density.

Equation (1) can be viewed as comprising four (4) different forces, where:
qE≡Coulomb force;
$\vec{P} \cdot \nabla \vec{E}$≡Kelvin polarization force;

$-\frac{1}{2}E^2 \nabla \varepsilon \equiv$ dielectric or Korteweg-Helmholz force; and $\nabla \left[ \frac{1}{2} \rho \frac{\partial \varepsilon}{\partial \rho} E^2 \right] \equiv$ electrostrictive force.

In general, the Coulomb force is responsible for electrophoresis and electro-osmosis. Namely, electrophoresis occurs when a coulomb force is applied to a particle or molecule that has a charge (e.g., DNA) in the bulk of the fluid. Whereas, electro-osmosis occurs when a coulomb force is applied to a charge layer formed at a solid-liquid interface, e.g., a sleeve or tube of charges along the inside surface of a microchannel. The Kelvin polarization force generally exists where the electric field is nonuniform. These nonuniformities can exist for example at the edges of the electrodes. The dielectric or Korteweg-Helmholz force is significant, for example, in the presence of a nonuniform medium, such as a medium containing dispersed particles such as particles of pigment. The electrostrictive force contributes in systems where the mass density of the fluid changes, such as in systems for pumping a compressible fluid. A detailed description of these forces is disclosed in *Continuum Electromechanic,* by James R. Melcher (1981) MIT Press.

Thus, the contribution from forces can vary significantly from implementation to implementation. Furthermore, it should be understood that equation (1) does not account for other factors such as fluid dynamics. Thus, those skilled in the art will realize that the present invention can be modified to account for effects from different electrode configurations, different fluid characteristics and different materials used in the formation of the pumps illustrated in the present specification. To illustrate, if the electrodes are separated farther apart, e.g., typically above 500 μm, and the fluid has free charges, e.g., an electrolyte solution, electro-osmotic forces contribute to a greater extent in the movement of the fluid than other forces. In contrast, if the pump electrodes are positioned closer, e.g., typically between 200–500 μm, and the fluid does not have the charges, e.g., organic solvents like THF, forces acting on injected or induced charges contribute to the movement of the fluid. The first and third terms of the above equation reflect a substantial portion of the forces acting on such injected or induced charges.

Thus, since coulomb (electro-osmotic and/or electrophoretic), polarization, dielectric or electrostrictive forces are typically present to some extent, the electrode-based pumps should be interpreted as electrofluidic pumps operating under one or all of these forces or operating under forces as yet undescribed. Thus, depending on the behavior and composition of the fluids, suitable electrode-based can be selected and implemented to satisfy the requirement of a particular application that uses the present pumps.

In fact, electrode-based pumps can operate under other phenomena, other than electrohydrodynamics, e.g., "electrowetting". A description of the electro-wetting phenomenon can be found in "Continuous Electrowetting Effect", by G. Beni et al., Appl. Phys. Lett. 40 (10), May 15, 1982 and "Dynamics Of Electrowetting Displays", by G. Beni et al., J. Appl. Phys. 52 (10), October 1981. Electrowetting is the change of a material's wettability caused by an electric field that alters the liquid-solid interfacial tension. In fact, it is believed that the electro-wetting phenomenon contributes to the enhanced pumping pressures observed with electrode-based pumps that incorporate ring electrodes.

In preferred embodiments of the invention, ring electrodes are located at the exits of fluid channels, meaning at locations where a fluid channel exits into a less restrictive structure such as a chamber. Ring electrodes dictate that current is distributed more evenly in a fluid channel, meaning that for example salvation spheres located at all parts of a cross-section of the fluid channel are significantly acted upon by a field applied to the electrodes, resulting in greater bulk flow.

The pumps of the present invention, by generating higher pressures, allow for greater flexibility in operating a liquid distribution system that uses capillary breaks and gas reset features. Capillary breaks can have different break yielding pressures depending on fabrication variations and on the liquid pumped through the capillary break. In the liquid distribution system described for example in U.S. application Ser. No. 08/744,386, filed Nov. 7, 1996, for example, a pressure head is used in conjunction with the pumping pressure generated by micropumps to create the pressure needed to break a capillary barrier. With the greater pressure generated by the pumps described herein, the operating parameters needed to concurrently pump a variety of fluids are less stringent. For example, the pressure head for all the liquids can be set at one value selected as the pressure which is insufficient to break any of the capillary barriers, but high enough so that the pumps can generate the pressure needed.

Fabrication of Point Electrodes

Point electrodes are for example constructed by first forming, through the device in which the electrode-based pump is used, an electrical conduit for bringing a voltage to a fluid-channel contacting electrode. The end of the electrical conduit can serve as the electrode, or the end can be coated with an appropriate material such as chromium, gold, silver, platinum, palladium, nickel and the like. For example, the conduit can be formed in a via, such as a laser drilled via, by fusing a via ink that has been inserted into the vias using the methods set forth in U.S. Pat. No. 5,842,106 (U.S. application Ser. No. 08/554,887, filed Nov. 9, 1995). The fluid channel-contacting end of the conduit can for example be electroplated with nickel (e.g., 20 μm), followed by electroplating with gold (e.g., 0.5 μm) and then platinum (e.g., 2 μm).

Creating a Conductive Layer

The conductive layer illustrated in FIG. 5 can be made of any material that is conductive as a whole or in selected regions. Thus, the conductive layer can be a material that is conductive as a whole, such as a metal layer, or the conductive layer can be mostly a non-conductive material on which conductive pathways have been formed by, for example, a photolithographic technique. In one embodiment, the conductive layer is a layer of doped silicon. The silicon can be doped for example with boron or phosphorus by diffusion, where dopant ions are placed next to the desired regions of a material and become incorporated in the material by diffusion, or ion implantation, where dopant ions are implanted by bombarding a material with a high energy ion beam. Using appropriate masks, such as masks formed by photolithographic techniques, the doping can be applied to selected regions of a substrate of silicon that will be incorporated into a device containing a pump of the invention.

A benefit of using a silicon layer to construct ring electrodes, particularly where the ring electrode is formed at a capillary break, is that silicon is especially suitable for microfabrication techniques such as chemical etching and laser drilling. Thus, in many cases more uniformly shaped ring electrodes and capillary breaks can be fabricated in silicon. Silicon also anodically bonds to glass without the need for an intervening layer of a material for facilitating such bonding.

To facilitate handling, a silicon plate that is thicker than intended for the final structure, such as for one exemplary embodiment a 2.0 inch×2.0 inch×20 mil plate, can be treated for form the appropriate microfabricated structures such as holes that will form ring electrodes or capillary breaks, be aligned and bonded with another plate, such as a glass plate formed of Corning 1735 boroaluminosilicate glass, or Corning 7740 borosilicate glass (Pyrex™, annealing temperature=560° C.), available from Corning Glass Co., Corning, N.Y., by anodic bonding. Suitable anodic bonding techniques are described in U.S. Pat. No. 5,747,169 (U.S. application Ser. No. 08/745,766, filed Nov. 8, 1996). After the plates are bonded, the plates can be thinned, for example to 6 mil by lapping.

Creating a Conductive Coating

Convenient methods to create conductive coatings include vapor deposition of a metal using a mask such as a photolithographic mask to protect portions of the device on which on conductive coating is desired. Such vapor deposition methods can include thermal evaporation of metal or electron beam evaporation. For example, chromium and gold can be vapor deposited together or separately, and the conductive layer further coated with platinum by electroplating. The electrical conduits to such conductive coatings can be the same kind of electrical conduits described above. For example, where the electrical conduit is formed in via through a substrate, the mask used to direct vapor deposition is selected to create a conductive layer connecting the electrical conduit and the area defining the ring electrode.

Unless the fluid channel at outlet, such as an outlet 632, is temporarily filed or some other protective measure is taken, typically a vapor deposition method will result in coating a portion of the interior of the fluid channel, with the depth of penetration being dependent on such factors as the time of deposition. Often, this internal coating is a desired result. Once coated, the base conductive layer can be further coated by electroplating.

Methods of Forming Small-Scaled Structures

Small-scaled structures can be formed as described, for example, in U.S. application Ser. No. 08/556,036, filed Nov. 9, 1995. For example, in suitable materials such as glass or silicon, structures can be formed by chemical etching or laser ablation. Plastic structures are often formed by molding techniques. With holes formed in substrates by laser ablation, particularly holes formed in glass, it is often useful to roughen the side of the substrate at which the hole will outbreak. The roughening helps limit the scope of any fracturing that occurs at the outbreak site. Following the formation of such holes, the surfaces of the plates can be lapped and polished.

In situations where one seeks substantial selectivity in the shape of an etched structure, such as substantially vertical walls which can be desirable in substrate-traversing holes, one can apply dry etching techniques such as plasma-assisted etching. In plasma-assisted etching an electrical field can be used to direct the plasma etchant along a given axis, thereby increasing the crispness of the etch boundaries. Such techniques are described in more detail in *Semiconductor Devices, Physics and Technology,* S. M. Size, John Wiley & Sons, pp. 457–465, 1985.

While this invention has been described with an emphasis upon preferred embodiments, it will be apparent to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A device that moves liquid comprising, within a substrate comprising two or more joined plates:

a channel of capillary dimensions comprising a straight segment formed through one or more of the plates; and an electrode-based pump comprising two electrodes contacting the channel segment within the interior of the substrate which, when powered, form stronger or weaker electric field lines between the electrodes, wherein the electrodes are arrayed so that (i) the strongest electric field lines cross a cross-section of the channel, or (ii) the electrodes are concentrically arrayed around the channel such that the strongest electric field lines parallel the channel on more than one face of the channel and are substantially parallel to the direction of liquid flow in the channel, wherein a first one of the electrodes (a) comprises a conductive material incorporated into a said plate or (b) a conductive material incorporated at the junction of two said plates, and wherein the pump is adapted to move liquid by applying voltages to the two electrodes.

2. The device of claim 1, wherein the electrode-based pump comprises:

(a) a first electrode on one face of the channel and a second electrode on a second face of the channel.

3. The device of claim 2, wherein one or more electrodes are formed at an outlet of the channel into a cavity within the substrate.

4. The device of claim 1, wherein the first electrode of the electrode-based pump comprises: a conductive material incorporated into a said plate forming a ring electrode.

5. The device of claim 4, wherein the first electrode is formed at an outlet of the channel into an internal cavity within the substrate.

6. The device of claim 4, wherein the first electrode is formed of a said plate of doped silicon.

7. The device of claim 6, wherein the two electrodes comprise a pair of electrically coupled ring electrodes.

8. A device that moves liquid comprising, in a substrate comprising two or more joined plates:

a channel of capillary dimensions, comprising a straight segment formed through one or more of the plates, which straight segment has an outlet to a cavity within the substrate;

a first electrode formed at the outlet; and electrically coupled to the first electrode, a second electrode in the channel segment, wherein the device is adapted to apply voltage to the electrodes, which voltage is effective to move the liquid through the channel.

9. The device of claim 8, where the outlet forms a capillary harrier.

10. The device of claim 8, wherein the first electrode has electrode surface formed on the walls of the channel adjacent to the outlet.

11. The device of claim 8, wherein the first electrode is a ring electrode.

12. The device of claim 8, wherein the first electrode is formed of a said plate of doped silicon.

13. The device of claim 12, wherein the second electrode is aligned with the center of the straight channel segment terminating at the outlet.

14. The device of claim 13, wherein the second electrode is a point electrode.

15. A device that moves liquid comprising, in a substrate comprising two or more joined plates:

a channel of capillary dimensions with an outlet, the outlet defined by an opening through a first said plate;

a first electrode formed at the outlet and comprising a conductive material incorporated into the first plate; and electrically coupled to the first electrode, a second electrode in the channel, wherein voltage applied to the electrodes is effective to move the liquid through the channel.

16. The device of claim 15, wherein the electrode-forming plate comprises silicon, and the conductive material comprises doped silicon.

17. An device according to claim 16, comprising an array of pumps formed in the substrate, wherein the electrode-forming plate comprises a patterned distribution of doped silicon such that a voltage can be selectively applied to an electrified ring electrode or an electrified subset of the ring electrodes by applying voltage to a point in the electrode-forming plate that is electrically connected the electrified electrodes via a conductive pathway of doped silicon.

18. The device of claim 15, wherein the first electrode comprises a conductive layer applied to at least one side of the electrode-forming plate.

19. The device of claim 18, wherein the first electrode is a ring electrode.

20. The device of claim 19, wherein the conductive layer extends to intersect with a conductive conduit that serves to deliver voltages to the ring electrode.

21. The device of claim 20, wherein the conductive conduit is formed of fused via ink in a via extending through one or more of the plates.

22. The device of claim 21, wherein the first electrode has electrode surface formed on the walls of the channel adjacent to an outlet of the straight segment to a cavity within the substrate.

23. The device of claim 21, wherein the second electrode is a point electrode aligned with about the center of a straight channel segment terminating at the outlet.

24. A device that moves liquid comprising, in a substrate comprising two or more joined plates:

a channel of capillary dimensions, comprising a straight segment formed through one or more of the plates, which straight segment in fluid communication with an outlet to a cavity within the substrate;

a first ring electrode contacting the straight channel segment; and electrically coupled to, and located with 500 $\mu$m of, the first electrode, a second electrode in the channel segment, wherein voltage applied to the electrodes is effective to move the liquid through the channel.

* * * * *